United States Patent [19]

Olaniran et al.

[11] Patent Number: 4,970,783

[45] Date of Patent: Nov. 20, 1990

[54] METHOD OF MAKING SPLIT REMATEABLE CONNECTING ROD PORTIONS

[75] Inventors: Moses A. Olaniran, Melvindale; Charles A. Stickels, Ann Arbor, both of Mich.

[73] Assignee: Ford Motor Company, Dearborn, Mich.

[21] Appl. No.: 450,764

[22] Filed: Dec. 14, 1989

[51] Int. Cl.⁵ .............................................. B23P 15/00
[52] U.S. Cl. ................................. 29/888.09; 29/413; 29/414; 29/416; 29/888.011; 74/579 E
[58] Field of Search .................. 29/156.5 A, 416, 413, 29/414, 888.09, 888.011; 204/129, 130, 140; 148/4, 134; 74/579 E

[56] References Cited

U.S. PATENT DOCUMENTS

| | | | |
|---|---|---|---|
| Re. 26,261 | 9/1967 | Shepard et al. | 204/140 |
| 2,553,935 | 5/1951 | Parks et al. | 29/415 |
| 3,751,080 | 8/1973 | Bailey et al. | 287/52.03 |
| 3,994,054 | 11/1976 | Cuddon-Fletcher et al. | 20/156.5 A |
| 4,198,879 | 4/1980 | Hornak et al. | 29/156.5 A |
| 4,304,593 | 12/1981 | Maeland | 204/140 |
| 4,569,109 | 2/1986 | Fetauk | 29/156.5 A |
| 4,768,694 | 9/1988 | Fabris et al. | 225/94 |
| 4,802,269 | 2/1989 | Mulcai | 29/156.5 A |
| 4,860,419 | 8/1989 | Hekman | 29/413 X |

OTHER PUBLICATIONS

"Connecting Rods ARE Cracked to Perfection", Machine Design, Mar. 10, 1988, p.66.

Primary Examiner—Howard N. Goldberg
Assistant Examiner—Irene Cuda
Attorney, Agent, or Firm—Joseph W. Malleck; Roger L. May

[57] ABSTRACT

A method of cracking bearing assembles including the steps of (a) forming a ductile metal (steel, aluminum or titanium) connecting rod in one piece (e.g., by hot forging) having an annular wall defining a crankshaft opening with preformed surface crevices for guiding the initiation of a cracking plane that extends across the crank opening; (b) charging (i.e., for about 40 seconds) the region of such wall along at least one portion of the cracking plane with hydrogen by means of an electrolytic cell or by means of reacting the metal rod with a strong acid (e.g., concentrated sulfuric) to cause hydrogen to dissolve in the metal to facilitate hydrogen stress cracking thereat, with or without the imposition of static mechanical tensile loading at such crevices (i.e., for about 40 seconds) of a magnitude insufficient to cause yielding of the metal; and (c) prolonging, increasing, or imposing the static mechanical loading (i.e., for another 40 seconds) at the crevices to effect fracture across the entire cracking plane and thereby separate the connecting rod into a cap and body with rough, fractured mating surfaces.

20 Claims, 10 Drawing Sheets

METHOD OF MAKING SPLIT REMATEABLE CONNECTING ROD PORTIONS

BACKGROUND OF THE INVENTION

1. Technical Field

This invention relates to the art of making annular bearing assemblies with separable journalizing parts that permit reception of a shaft other than along an axial direction of the bearing, and more particularly to the art of splitting connecting rods for use in automotive internal combustion engines using techniques which more readily propagate the splitting.

2. Description of the Prior Art

Automotive connecting rods usually have one end (large end) with separable cap and body portions to form an annular bearing assembly which permits insertion of a complex configured crankshaft from a direction not along the axis of the bearing. A simple ring bearing assembly is at the opposite end (small end) of the connecting rod which is connectable to a piston by a pin; the simplicity of this attachment is permitted by insertion of the pin along the axis of its bearing.

The advent of more compact engines, delivering higher horsepower at increasingly higher rpm's, has placed increased stress on the connecting rod and its bearings. The bipartite rod must act as a unitary piece to transfer dynamic forces with better bearing life. To meet this challenge, the manufacture of automotive connecting rods has undergone evolutionary changes.

Connecting rods were originally made by casting or forging separate attachable cap and body portions. These parts were usually made of medium carbon wrought steel and were separately machined at both joining and thrust faces; they were then separately drilled with holes to accept fasteners.

A first evolutionary step was to cast or forge the connecting rod as a single steel piece, followed by drilling of holes to accept fasteners. The single piece was sawed to obtain cap and body portions which were separately rough-machined at the thrust and contacting surfaces; the two portions were then bolted together for finish-machining. The separate steps of machining and sawing were not only cumbersome and expensive, but they also did not ensure a perfectly matched cap and body under all operating forces. Under some operating conditions, inherent diametrical fastener clearance permitted slight shifting of the cap and body portions which in turn affected bearing life.

As the next step in this evolutionary change, a single-piece connecting rod was split or cracked into cap and body portions in the hope of providing nonsliding surfaces where the cap and the body portions are bolted together. The hope was that if the surfaces were properly remated, the remate would prevent any microshifting and assure accurate operating alignment. To split the single piece into two, it was initially struck on one side with a sharp blow. This met with little success because of the uncontrollability of the cracking plane and possible damage to the connecting rod.

Another early attempt inserted a wedge-expandable mandrel into the large bore of the rod (see U.S. Pat. No. 2,553,935). The big end of the rod would fracture at the two weakest sides of the yoke; such cracking was carried out at room temperature even though the rod was made of a strong, nonbrittle, high carbon wrought steel. Cutting deep radial reductions at the intended cracking plane by sawing, milling and drilling, or a combination of all three, reduced the crackable section and weakened the material to assist cracking. This did not assure distortion-free cracked surfaces of such a tough material.

Another approach to splitting was disclosed in U.S. Pat. No. 3,751,080, which recognized the difficulty of fracturing strong high carbon steels at room temperature when they were formed in large sizes adequate for automotive engine applications. An electron beam was moved along a desired path in an undulating fashion which separated the rod to render a pair of rippled interfacing surfaces. This technique is undesirable not only because a high energy electron beam imparts a deleterious effect upon material performance but also because it is slower and more costly than previous techniques.

Yet another attempt to provide for cracking of ductile strong steel connecting rods is shown in U.S. Pat. No. 3,994,054, wherein tension forces were provided mechanically by conical pins forced into bolt holes at each side of the big end of the connecting rod. The bolt holes reduced the split plane section and the tapered pins provided a more equalized cracking impact. Unfortunately, this technique resulted in wear on the sides of the bolt openings causing distortions and thus inhibited accurate remating.

More recent attempts at splitting are disclosed in U.S. Pat. Nos. 4,569,109 and 4,768,694, which suggest that the rod can be composed of either cast iron, aluminum or steel, and made brittle by freezing or heat treatment. The connecting rod is fractured by applying high impact tension forces (i.e., 90,000 psi or greater) across a cracking plane defined by two notches in the internal surface of the large end bore while limiting relative movement of the cap and body portions to avoid ductile bending or incomplete fracture. The exact direction of the cracking plane cannot always be assured even though the notches are presented in the internal surface to provide such direction. Embrittlement by freezing or heat treatment leads to this indefiniteness of direction of the crack. As much as 25% of a production run of cracked rods with this method may have to be scrapped because the final crack planes are improperly placed.

A primary object of this invention is to provide an improved and more economical process for making split connecting rods with a greater consistency of accurate cracking at higher production levels and with improved cracked surface remating.

SUMMARY OF THE INVENTION

The invention is a method of making a connecting rod for attachment to a bearing journal by separation of the connecting rod. The method comprises: (a) forming a ductile metal connecting rod in one piece having an annular wall defining a crank opening with preformed surface crevices for guiding the initiation of a cracking plane that extends across the crank opening; (b) exposing at least a region of the wall adjacent to and including a crevice to a source of hydrogen for dissolution of the hydrogen into the metal of the rod near or at the root of the crevice and promote cracking thereat, with or without the imposition at the crevices of a mechanical stress insufficient to cause plastic yielding of the metal; and (c) prolonging, increasing, or imposing static mechanical loading at the crevices to effect complete fracture across the entire cracking plane and thereby separate the connecting rod into a cap and body with fractured mating surfaces. The cap and body are remated after separation by use of a threaded fastener which draws the cap and body together to provide substantially an exact rematch of the cracked surfaces.

Forming of the ductile metal connecting rod may be by hot forging; steel rods are typically forged at a temperature in the range of 1800°-2400° F. Aluminum or titanium rods are forged at lower temperatures. The ductile metal rod may be comprised of any ductile metal including, for example, aluminum, titanium and steel (preferably SAE carbon or alloy steel with 0.4-0.8% carbon, such as SAE 1151). The surface crevices may be incorporated into the connecting rod either at the time the connecting rod is forged, such as by embossing indentations, or may be provided subsequent to the forging operation by independent machining of sharp-angled notches. Such notches preferably should have an included angle in the range of 30°-120° and a root depth of about 0.030 inches.

The connecting rod can be exposed to hydrogen in the vicinity of the crevices or notches in one of three ways. First, exposing may be carried out by use of an electrochemical bath with an acid electrolyte, with the connecting rod arranged as the cathode and another element in the bath as the anode, the exposure time being for a period preferably of 20-60 minutes at a temperature in the range of 50°-100° F. Preferably, the acid electrolyte may be 1 N sulfuric acid. Following treatment, the connecting rod is loaded for cracking in a manner described below. The region which is exposed to the acid may consist of the entire lateral margin along the intended cracking plane, or may be merely the region within the surface crevice. Sometimes it is advantageous to isolate the region by use of masking when exposing or applying the acid electrolyte.

As a second mode, an electrolyte may be formulated from an agar gel and applied to crevices of the rod. Suitable electrodes (anodes) are arranged to contact the gel while the rod is made cathodic, forming an electrolytic cell. While hydrogen charging is occurring, the rod can be simultaneously loaded to provide a tensile stress at the root of the crevices, insufficient to cause yielding, but sufficient to eventually create crack fissures. The rod can be loaded for attaining full fracture or cleavage subsequent to charging with hydrogen.

As a third mode, exposure may be carried out by depositing drops of concentrated acid in the crevices included in the exposure region while imposing static tensile stress insufficient to cause yielding to such crevices. Hydrogen is liberated by the reaction of the acid and metal, and hydrogen atoms migrate to the stressed region at the root of the crevice inducing formation of crack fissures. Preferably, the acid may be concentrated sulfuric acid (95% minimum concentration).

Loading, applied to the connecting rod for inducing and propagating cracking, may be provided by use of an expandable mandrel inserted within the large end or crank opening of the connecting rod. When an axial force is applied to a loading column extending along the axis of the crank opening, it will wedge apart laterally facing, crescent-shaped portions to apply tension to the crank opening proportional to the column loading. The force applied to the rod by the crescent-shaped portions must be below that needed to cause yielding of the metal. Loading may preferably be carried out for a time period of up to 60 seconds for crack initiation (i.e., fissures) and may be continued for an additional period of up to 60 seconds to complete the entire fracture or cleavage.

Alternatively, such hydrogen stress embrittlement may be reversed at any moment of processing by exposing the connecting rod to a bake step, preferably in the temperature range of 300°-400° F. for 1-4 hours. When the process is carried out in a mode in which the rod is simultaneously stressed during hydrogen charging, baking should never be necessary to restore ductility to the rod after cracking and reassembly because very little hydrogen enters the bulk of the part.

DETAILED DESCRIPTION AND BEST MODE

The process essentially consists of three steps, each of which may be subdivided. The steps include: (a) forming a ductile metal connecting rod in one piece having an annular wall defining a crankshaft opening with preformed surface crevices for guiding the initiation of a cracking plane that extends across the crankshaft opening; (b) exposing at least a region of such wall adjacent to and including a crevice to a source of hydrogen for dissolution of the hydrogen into metal of the rod near the root of the crevice and thereby effect cracking thereat, with or without the simultaneous imposition of a mechanical stress insufficient to cause plastic yielding of the metal at such crevices; and (c) prolonging, increasing, or imposing static mechanical loading at the crevices to effect fracture across the entire cracking plane and thereby separate the connecting rod into a cap and body with fractured mating surfaces.

FORMING

Figure 1:
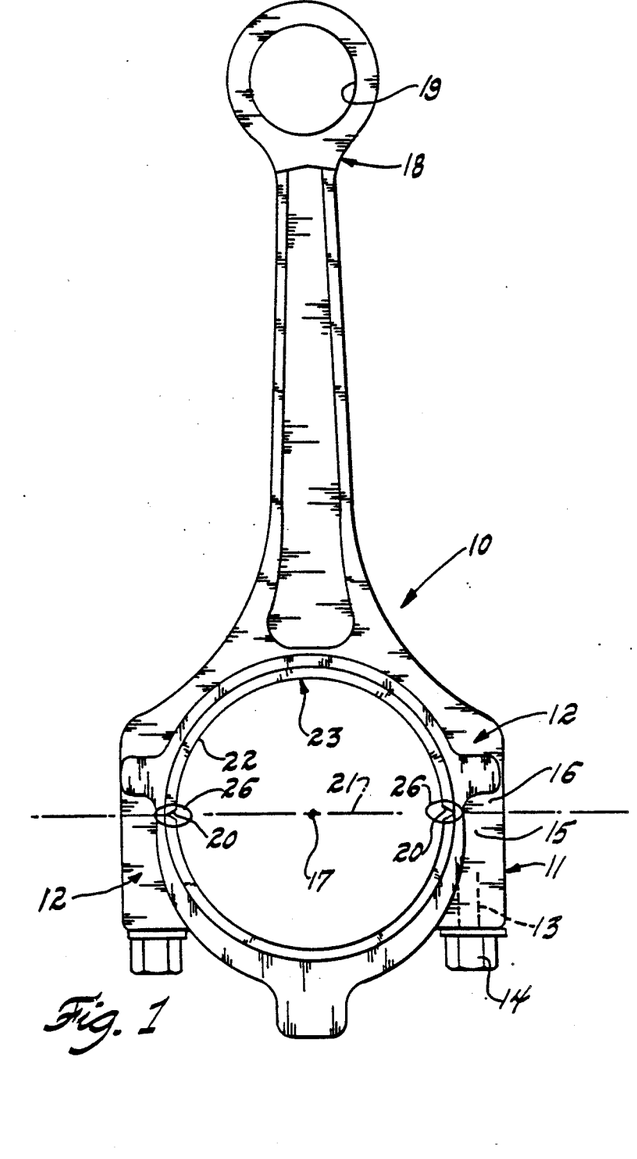
FIG. 1 is an enlarged plan view of a cracked connecting rod subjected to the process of this invention.

As shown in FIG. 1, the connecting rod 10 is preferably formed by hot forging to have a one-piece shape consisting of a large end 11 provided with a bore or opening 23 to receive a crankshaft, shoulders 12 through which openings 13 are drilled, which later will accommodate threaded fasteners 14 to reassemble the two portions (cap 15 and body 16 split along plane 21) of the large end 11 of the connecting rod. Holes for the fasteners are provided perpendicular to the axis 17 of the large crank opening. The small end 18 of the rod has an opening 19 for a wrist pin connection to the piston of a typical engine.

The ductile metal for such connecting rod is made of a carbon or low alloy steel having a tensile strength in the range of 100,000–140,000 psi. Connecting rods, which may be used with this invention, may be also made from ductile (nodular) cast iron, aluminum, and titanium.

The large end 11 has an annular wall 22 defining a crankshaft opening 23, with two preformed surface crevices 20 at opposite sides, extending throughout the axial extent or thickness of the rod. The surface crevices 20 guide the initiation of cracking along plane 21 which includes the crevices. The crevices may be provided by embossing at the time the connecting rod is forged resulting in somewhat blunt notches. To improve the ability of such crevices to initiate the cracking plane, such crevices 20 may be machined after forging is completed so that each crevice will have an included angle in the range of 30°–120° with a sharply defined valley and a root radius typically of less than 0.015 inches.

CHARGING PARTS WITH HYDROGEN

Figure 2:
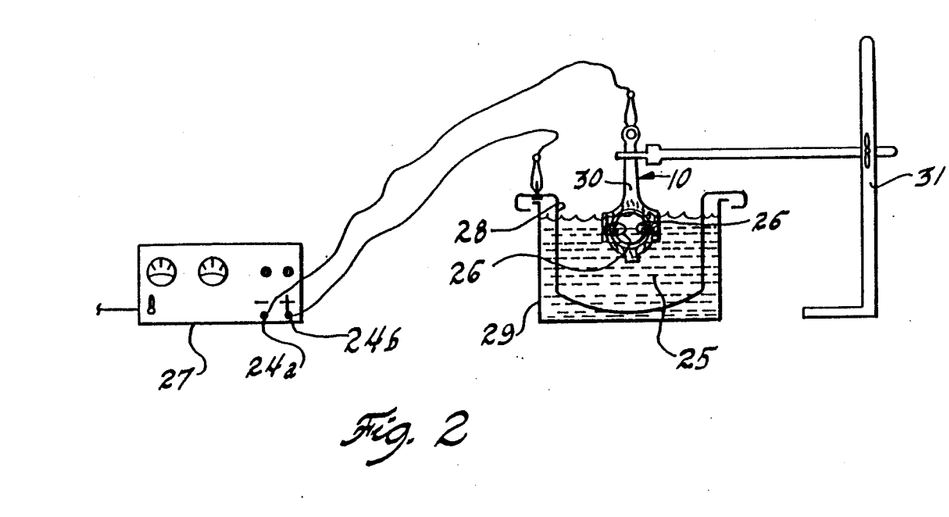
FIG. 2 is a schematic illustration of an immersion bath for carrying out hydrogen stress embrittlement with an electrical potential imposed on electrodes.

As a first embodiment, as shown in FIG. 2, the connecting rod 10 may be immersed within an electrolyte 25 that, upon passage of an electrical current, will liberate hydrogen at the surface of a selected region 26 of the rod. Some of the hydrogen liberated at the metal surface will diffuse into the rod. This result may be achieved by using an aqueous conducting solution of 1.0 normal sulfuric acid as the electrolyte 25 and with the connecting rod suspended by the support 31 as the cathode 30 in an electrochemical cell. Small concentrations of hydrogen evolution poisons, such as thiourea, may also be used in the bath. A voltage source 27 has its negative terminal 24A connected to a conductive anode sheet 28 wrapped along the inside surface of the vessel 29 containing the electrolyte; the connecting rod is connected to the negative terminal of the voltage source. To limit the region over which hydrogen is liberated to the region 26 along the margin of the intended cracking plane 21, the areas outside of region 26 of the connecting rod 10 may be coated with a masking paint; any one of a number of known compounds may be used here for "stop-off" in a plating solution.

To carry out the electrochemical treatment, the bath or electrolyte 25 is maintained at a temperature in the range of 50°–100° F., and the cathode 30 and anode 28 are maintained at an electrical potential to provide a current density of 200–400 mA/cm$^2$ at the metal surface. The period during which it has been found satisfactory to maintain hydrogen charging into the rod is about 20–60 minutes.

When the desired treatment time is completed, power is shut off to the system and the rod is rinsed in cold water. The connecting rod is then placed in a solvent bath for approximately two minutes to remove any masking present. After this, the rod is in a prepared condition for subsequent cracking when mechanical loading is applied across the cracking plane.

Figure 3:
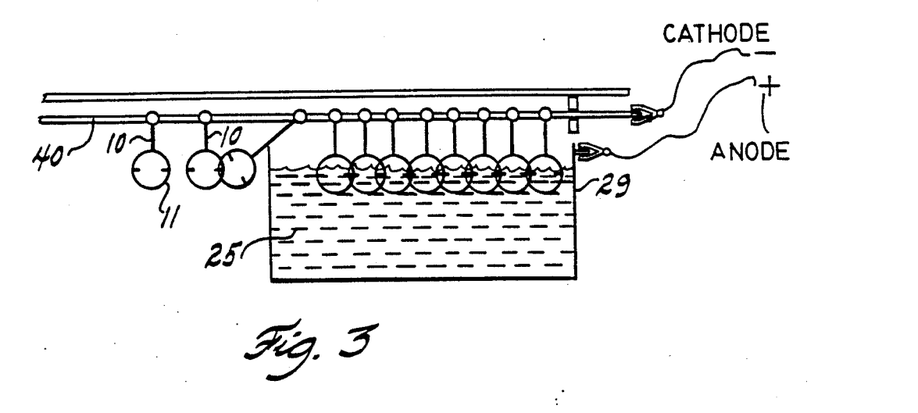
FIGS. 3 and 4 are variations of the apparatus of FIG. 2.

As shown in FIG. 3, the immersion bath may be further improved by characterizing the support for the connecting rods as a continuous conveyor line 40 permitting the connecting rods 10 to be fed therealong with only the crank end portion 11 immersed in the acid electrolyte 25. The supporting line 40 can be constituted as the cathode source and the container 29, which holds the electrolyte, as the metal anode.

Figure 4:
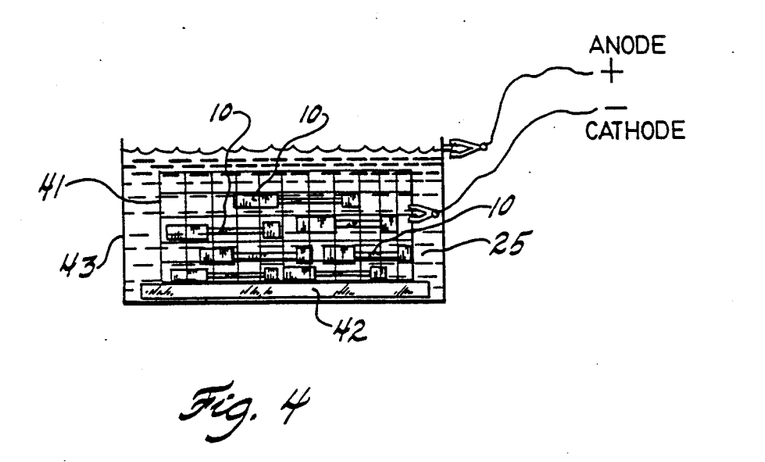

In a further variation of this mode, as shown in FIG. 4, the connecting rods 10 may all be stacked within a conductive wire basket 41 which in turn is electrified to act as the negative cathode; the conductive container 43 for the acid electrolyte 25 may be connected as the anode, provided that a glass or other insulating platform 42 is placed beneath the basket.

Figure 5A:
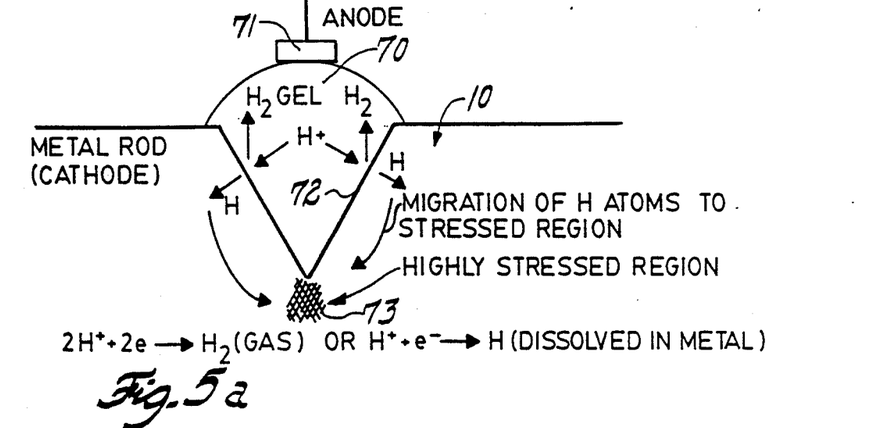
FIGS. 5a and 5b are schematic illustrations of hydrogen stress cracking microcells formed by the combination of metal exposure to acid at a crevice and the simultaneous imposition of static mechanical stress, FIG. 5b uses liquid acid drops and 5a uses an acid gel.

As a second embodiment, as shown in FIG. 5A, a self-contained electrochemical cell 70 can be constituted by using an agar gel as an electrolyte. The gel is applied to the crevice region and suitable electrodes 71, acting as anodes, may be arranged to contact the gel while the rod 10 is made cathodic. Upon application of an electric current via the cathode, the rod is charged with hydrogen only in the immediate vicinity of the crevice 72. The rod can then be broken by subsequent application of mechanical loading across the notch. It is advantageous, however, to apply a static mechanical load to the notch, insufficient to cause yielding of the rod metal, to create a highly stressed region 73 at the same time that hydrogen charging is occurring. By this means, the time required for charging and cracking is reduced to less than two minutes.

Figure 5B:
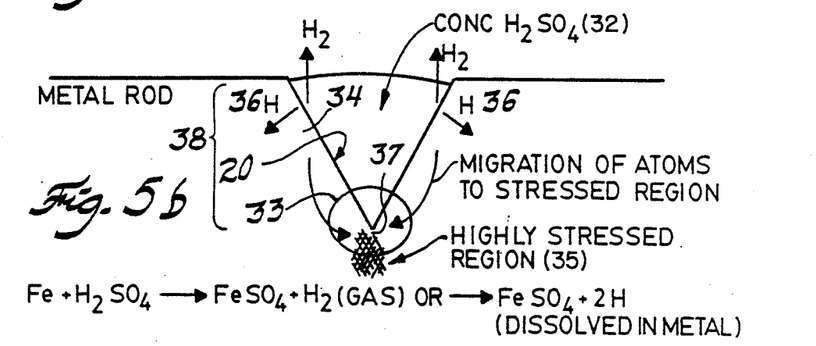

As a third embodiment, shown in FIG. 5B, a preferred method is used to provide hydrogen to the surface of the crevice by an electrochemical system 38. This is formed as a self-contained microelectrolytic cell by applying a few drops of concentrated sulfuric acid 32 (i.e., 10–36 normal) to the preformed crevices 20 of the connecting rod 10 by an appropriate dispensing tool such as a glass pipette. The volume of such sulfuric acid may be advantageously controlled to be in an amount of less than 10 milliliters and dispensed to coat just the lower regions 33 of each crevice (root) throughout the entire lateral extent of the connecting rod. The sulfuric acid will react with the metal 34 to liberate hydrogen 36. No external electrical source is necessary. Concurrently, the rod is loaded, particularly region 33, to create a static tensile stress 35 at the root of the notch 33. The stressed region 35 may act as an anode and generate a small potential difference across the crevice root 33 which further enhances the hydrogen evolution from the electrolyte. The load applied must be insufficient to cause yielding of the rod, as will be discussed later.

Figure 14:
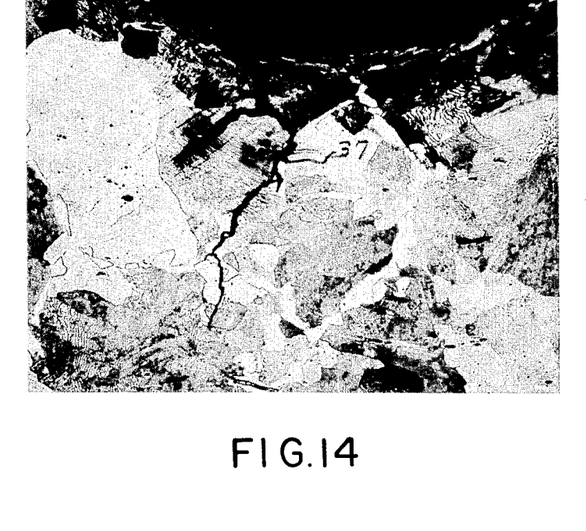
FIG. 14 is an enlarged photomicrograph of the region of a crevice exposed to acid and stressed resulting in partial and initiative cracks or fissures according to step (b) of this invention and prior to completion of fracture separation.

Hydrogen will tend to migrate or diffuse toward the highly stressed region 35 at the root of the crevice and promote cracking at this location. The mechanism of crack initiation may be due to dissolved hydrogen atoms which, when present in sufficient concentrations, recombine to form molecules which can exert a mechanical pressure of more than $10^6$ atmospheres inducing crack nuclei or fissures. The hydrogen-initiated crack fissures 37 (small, little fissures within the material as shown in FIG. 14) will begin to propagate as the stress intensity increases and more hydrogen is supplied to the crack or fissure tip. In this manner, the direction of the crack is controlled by the crevice configuration which is stressed. Thus, for this method mode to be effective, there must be a simultaneous application of stress and hydrogen evolution due to the reaction of acid. It has been found that such system, with a microelectrolytic cell, will produce fissures at the root of the crevice within a time period of one minute or less.

In automotive connecting rods, the diameter of the crank opening is typically in the range of 1.75-2.25 inches. Using the methods of this invention, separation of the cap and rod can be accomplished by fracture with little distortion of the shape of the crank opening. After fracture, surfaces are remated and drawn together by threaded fasteners; it is found that the increase in hole diameter in a direction perpendicular to the plane of the fracture is typically about 0.008 inches.

Figure 6:
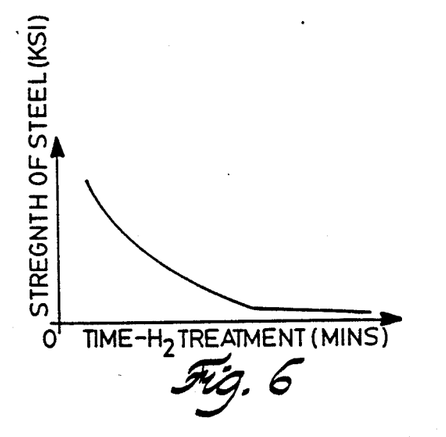
FIGS. 6 and 7 respectively are graphical illustrations depicting the variation of strength of the steel for the connecting rod and the percent elongation as a function of acid treatment time.

The length of time required for hydrogen diffusion can be decreased by increasing the strength of the steel of which the connecting rod is constituted, e.g., a yield strength of 145 ksi or above. As shown in FIG. 6, steel in this strength range and above is highly susceptible to hydrogen diffusion, while steels in the strength range of 101-145 ksi are less susceptible.

Figure 7:
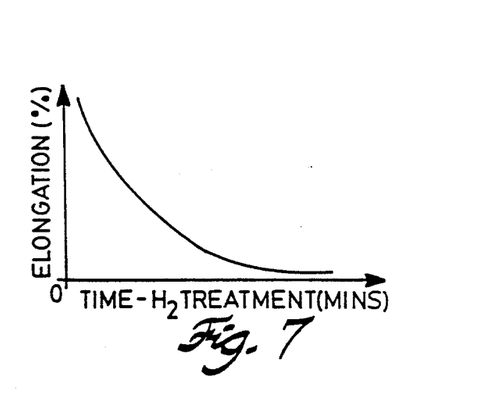

The allowable ductile deformation at the fractured surface is small. Elongations can be a function of hydrogen diffusion time. Thus, as shown in FIG. 7, by extending or retracting the hydrogen diffusion treatment time, the percent elongation or ductility in the final connecting rod, across the cracking plane, can be controlled.

Low Static Loading

Figure 8:
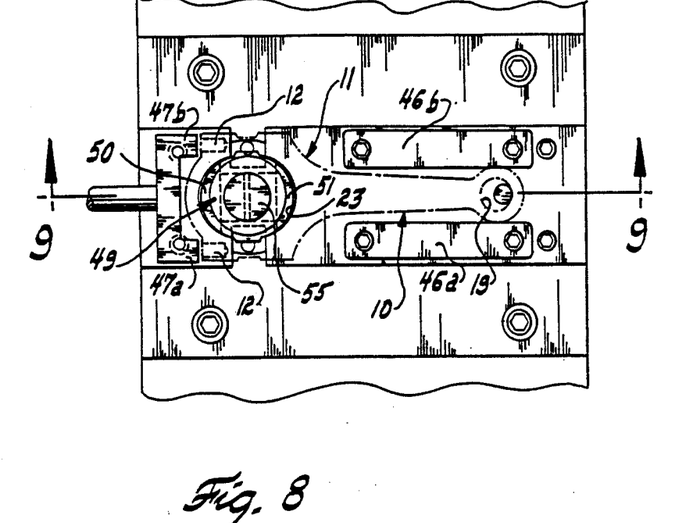
FIGS. 8 and 9 respectively are plan and elevation views of a cracking fixture utilized to apply static mechanical loading to the cracking plane of the connecting rod.
Figure 9:
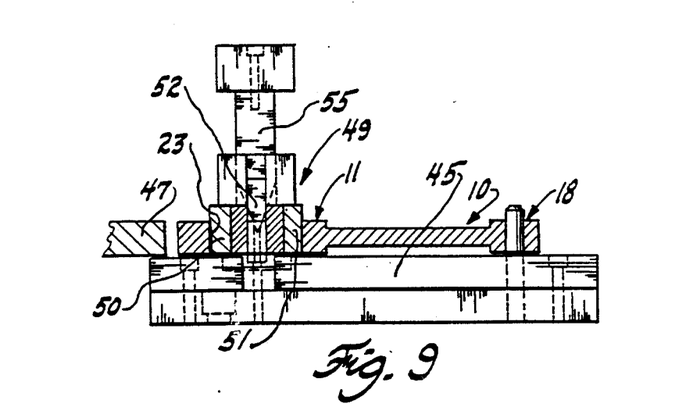

Static mechanical loading is provided (as shown in FIGS. 8 and 9) by creating tension across the cracking plane 21 with application of force to the inside of the crank opening wall 23. The one-piece connecting rod 10 is positioned on a support 45 having blocks 46A and 46B projecting outwardly to seat the small end 18 of the rod and having blocks 47A and 47B extending outwardly to loosely cradle the shoulders 12 of the large end 11.

An expandable mandrel 49 is inserted into the crank opening 23 of the connecting rod. The mandrel has two oppositely acting crescent-shaped members 50 and 51, each respectively provided with a semicircular surface which can engage only that portion of the wall which lies on one side of the cracking plane 21. A wedge 52 is interposed between the members 50, 51, and when forced by an actuator operating through a column assembly 55 attached to an extension of the wedge via a coupling, the wedge 52 will move the members 50 and 51 outwardly radially perpendicular to the plane of cracking.

When cracking is initiated by the simultaneous application of stress and hydrogen charging to the notch, the static force is that resulting from a column loading on the wedge of about 2500-3500 pounds when the included angle of the wedge is 40 degrees. For connecting rods with a cross-sectional area in the notch region of about 0.45 square inches, this results in a stress which is insufficient to cause yielding of the rod. It has been found that application of the stress for about 15-60 seconds while charging with hydrogen is sufficient to create crack fissures 37. Once the fissures have developed, cracking can be completed by either maintaining or slowly increasing the force applied to the wedge, as described below.

The amount of static crevice spreading force that should be applied when the microelectrolytic cell is used should be sufficient to induce an emf cell; the resulting force applied mechanically to the crevice surfaces 20 will be about 10-30% below that of the plastic yielding stress for the metal.

Prolonging or Increasing Mechanical Loading

This invention has discovered that after fissures are nucleated by the simultaneous application of static stress and hydrogen charging at a crevice, continued application of the stress for about 30-60 seconds will cause fracture by crack propagation across the entire cracking plane and the connecting rod will be separated into two portions. The static stress must be distinguished from stress due to impact loading. If a faster time to fracture is desired, static mechanical loading can be slightly increased. The connecting rod should be kept below 100° F., which will be ambient room temperature during the entire process of nucleating and propagating the fracture (low static loading as well as during the prolonged or increased static mechanical loading). Utilizing the microelectrolytic cell, no external electrical source is necessary; the electrical potential is generated by the emf cell reaction. There is no need for masking. There is also no need for baking of the connecting rod to remove dissolved hydrogen after fracture because the amount of hydrogen supplied to the rod is very small due to the brief time of charging.

Masking may sometimes be desirable with the immersion technique, and certainly baking is advantageous to reverse the effects of hydrogen embrittlement in the rest of the immersed rod after complete fracture has been accomplished. To this end, baking can take place in the temperature range of 300°-400° F. for a period of 1-4 hours.

Remating

Figure 10:
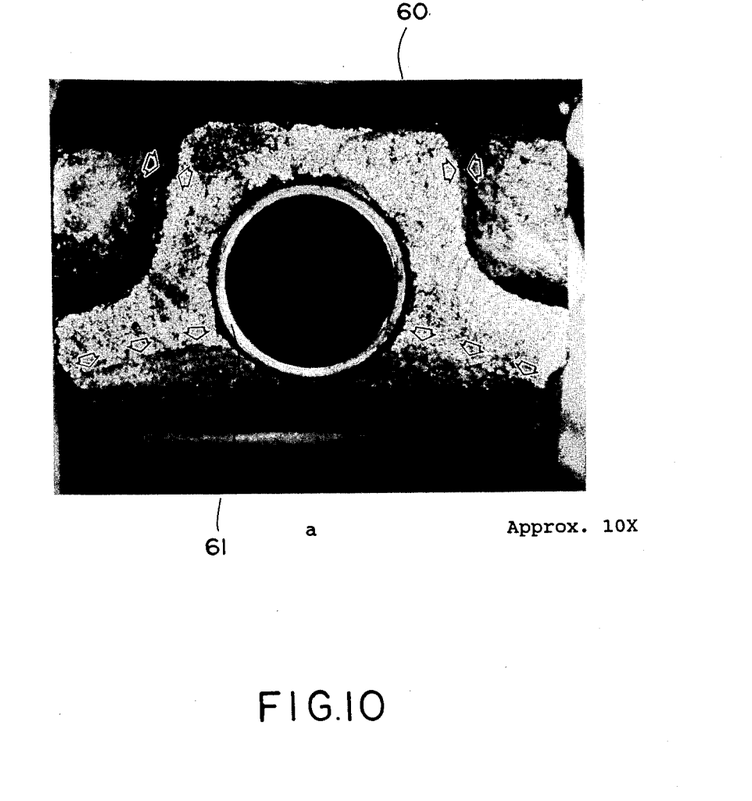
FIG. 10 is an enlarged photographic view of the cracked surface of one side of the connecting rod, the arrows indicating regions of hydrogen assisted slow crank growth.

Remating of the split portions of the connecting rod provides for an exact identity of the unique fracture roughness (see FIG. 10 for view of cracked surfaces 60). Threaded fasteners are inserted into the fastener openings 61 to draw the cap and body together.

Interlocking of the roughness on the mating fracture surfaces prevents subsequent shifting and misalignment of the cap and rod during final machining of the bore and during engine operation. With this system, the shank of each bolt and the unthreaded portions of the openings can have a diametrical clearance of 0.005-0.011 inches. In contrast, for rods separated by conventional machining operations, special precisely made fasteners must be used to provide near zero clearance between the unthreaded portions and the fastener because it is only by this means that shifting and misalignment of the cap can be avoided.

It is advantageous that the fasteners (preferably made of steel alloy SAE grade 8 bolts) be stressed by turning with high torque against the threads of the opening up to the yield point of the steel material of the bolt shank. The yield point of peaks of roughness of the cracked surface will be lower than the yield point of the alloy steel bolt. It is advantageous that alignment of the cap and body be provided because any mateable peaks and valleys not realigned will undergo some deformation when the cap and body are compressed together. Such deformation reduces the interlocking effect between the prints of the mating surfaces.

The method of this invention is unique in that fracture of annular shapes is brought about, not by applying high impact (high strain rate) tensile forces across a cracking plane, but essentially by build-up of static or near static (low strain rate) tensile forces across the cracking plane abetted by the internal action of dissolved hydrogen. Build-up of the concentration of dissolved hydrogen in regions stressed in tension at the root of a notch promotes fissuring of the metal and serves to guide the propagation of a crack through the metal.

Resulting Product Microstructure

Figure 11:
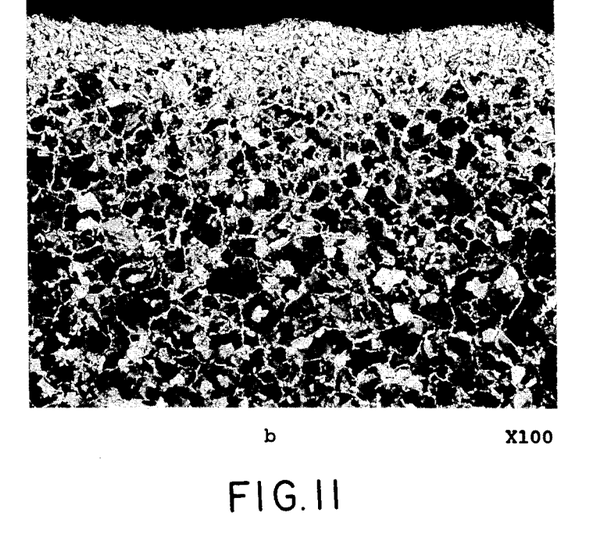
FIG. 11 is a photomicrograph of a metallographic section preparation of a connecting rod processed according to this invention, the photographed region being the inner surface of the crank opening adjacent a crevice; the region was etched in a solution containing 4% picric acid and 1% nitric acid in ethanol to illustrate the decarburization depth and also to illustrate the microstructure estimated to contain 5-8% ferrite.
Figure 12:
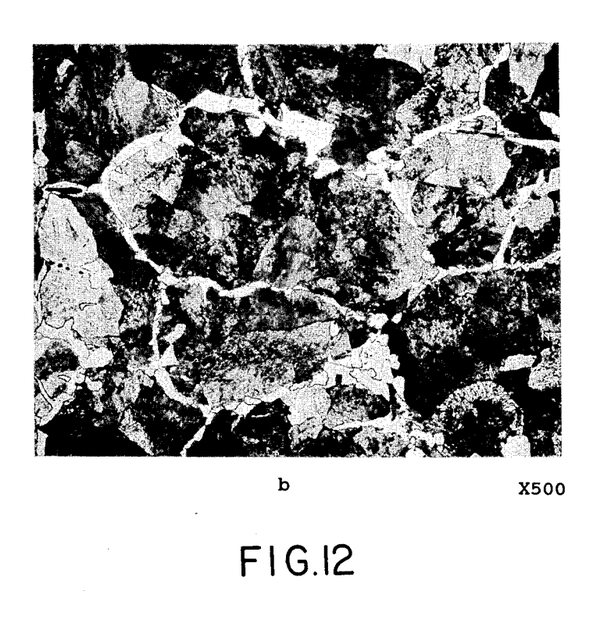
FIG. 12 is a photomicrograph similar to that in FIG. 11 at an expanded magnification level.

FIG. 11 (100X magnification) and FIG. 12 (500X magnification) show the microstructure of the hydrogen induced fractured steel forged connecting rods to be pearlite and 4-9% proeutectoid ferrite. The decarburization depth 62 is about 0.12 mm. The decarburization is accentuated by etching the photographed sample in a solution containing 4% picric acid and 1% nitric acid in ethanol.

Figure 13:
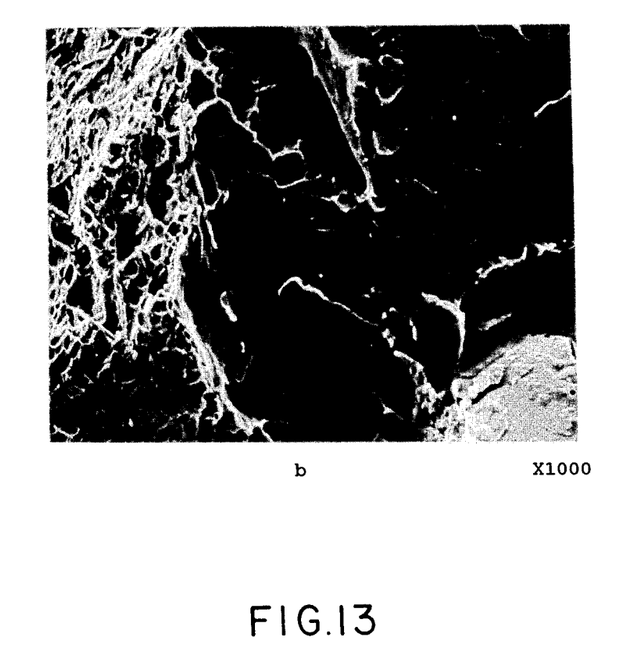
FIG. 13 is a scanning electron micrograph of the fracture surface of the connecting rod illustrating the fracture at the left hand portion caused by hydrogen.

FIG. 13 is a scanning electron micrograph of a portion of the fractured surface near the bottom of the crevice; the left side of the image shows the fracture surface resulting from hydrogen induced fracture near the crevice and the right side shows the fracture pattern for cleavage propagated from the hydrogen induced cracking.

FIGS. 14-17 compare the existence or nonexistence of induced fissures in the metal of rods varied as to processing.

FIG. 14 represents the invention with the metal photographed being subjected to acid and low energy static mechanical loading for one minute. Note fissures or cracking nuclei 37.

Figure 15:
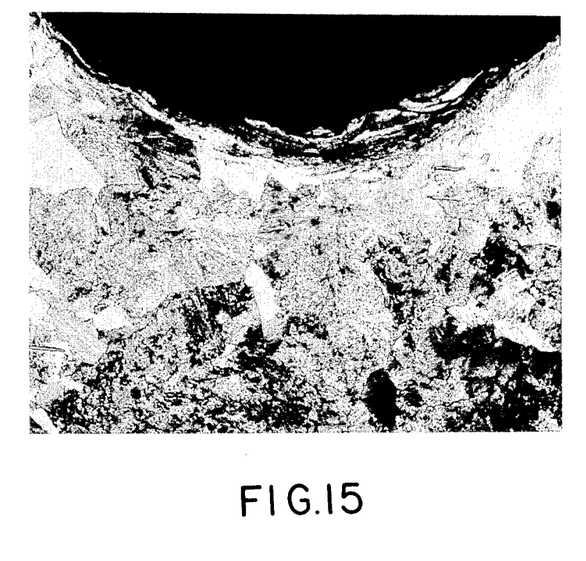
FIG. 15 is a photomicrograph similar to FIG. 14 but for a specimen which was not treated with acid but subjected to the same static mechanical loading.

FIG. 15 represents metal subjected to acid but no stressing by static mechanical loading during a two minute time period. Note the absence of any fissures.

Figure 16:
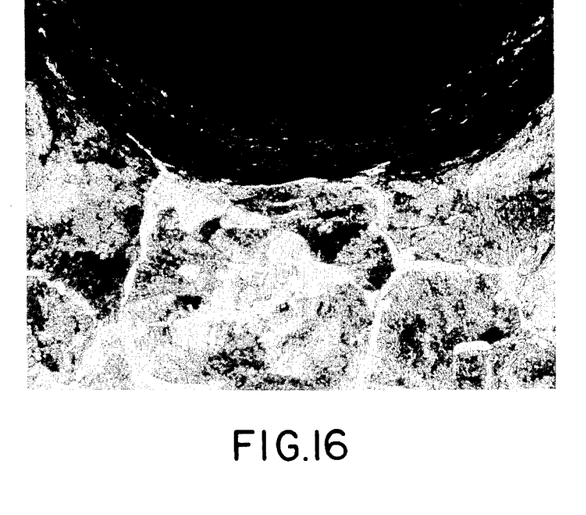
FIG. 16 is a photomicrograph similar to FIG. 14 but for a specimen subjected to the acid treatment at the crevice but not subjected to static mechanical loading.

FIG. 16 represents metal subjected to no acid but subjected to stressing by static mechanical loading for a similar time period. Note the absence of any fissures.

Figure 17:
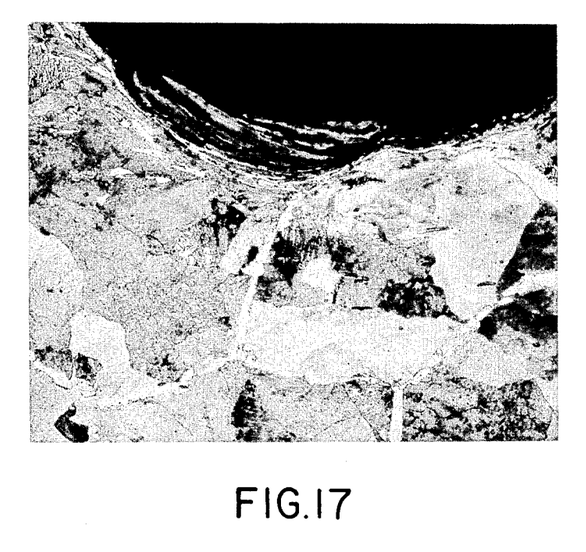
FIG. 17 is a photomicrograph similar to FIG. 14 but for a specimen neither subjected to acid treatment nor subjected to static mechanical stress at the crevice.

FIG. 17 represents metal subject to neither acid or stressing by static mechanical loading; again note the absence of fissures.

While particular embodiments of the invention have been illustrated and described, it will be obvious to those skilled in the art that various changes and modifications may be made without departing from the invention, and it is intended to cover in the appended claims all such modifications and equivalents which fall within the true spirit and scope of this invention.

What is claimed:

1. A method of making a connecting rod for attachment to a bearing journal by separation of the connecting rod, comprising:
   (a) forming a ductile metal connecting rod in one piece having an annular wall defining a crank opening with preformed surface crevices for guiding the initiation of a cracking plane that extends across said crank opening;
   (b) exposing at least a region of said wall adjacent to and including at least one crevice to a source of hydrogen to effect dissolution of said hydrogen into the metal of the rod near or at the root of such crevice and promote cracking thereat With or without the imposition at said crevice of static mechanical loading creating a mechanical stress insufficient to cause yielding; and
   (c) prolonging, increasing, or imposing said static mechanical loading at said crevices to effect complete fracture across the entire cracking plane and thereby separate the connecting rod into a cap and body with rough, fractured mating surfaces.

2. The method as in claim 1, in which said method further comprises a step (d): remating the cap and body after insertion of said bearing journal by a compression coupling drawing the cap and body together to effect substantially an exact remating of the fractured mating surfaces.

3. The method as in claim 1, in which said ductile metal connecting rod is formed of steel by hot forging at a temperature in the range of 1800°-2400° F.

4. The method as in claim 1, in which said connecting rod is constituted of a ductile metal selected from the group consisting of ductile (nodular) iron, aluminum, steel, and titanium.

5. The method as in claim 4, in which said ductile metal is SAE 1151 steel.

6. The method as in claim 1, in which said preformed crevices are forged thereinto at the time the connecting rod is forged.

7. The method as in claim 1, in which said preformed crevices are machined into the connecting rod subsequent to forging of the connecting rod, said crevices being constituted as sharp-angled notches having an included angle in the range of 30°-120°.

8. The method as in claim 1, in which said exposing step is carried out by depositing concentrated acid within the crevice while simultaneously subjecting the crevice to low tensile mechanical loading insufficient to cause plastic yielding of the metal.

9. The method as in claim 1, in which said exposing step is carried out by immersing said region in an aqueous acid solution wherein the connecting rod is a cathode and a steel wall within said bath is constituted as the anode for an electrolytic system.

10. The method as in claim 9, in which said aqueous acid solution is maintained at a temperature in the range of 50°-100° F.

11. The method as in claim 1, in which said region is constituted as the lateral margin along a cracking plane.

12. The method as in claim 11, in which said region is defined by masking the remainder of said connecting rod.

13. The method as in claim 1, in which said region is only the crevice.

14. The method as in claim 1, in which static tensile mechanical loading is applied by an expandable fixture inserted within the large crankshaft opening of said connecting rod to apply a force normal to a surface of the crevices.

15. The method as in claim 1, which further comprises the step of reversing hydrogen dissolution by a baking step comprising heating the connecting rod to a temperature in the range of 300°–400° F. for a period of 1–4 hours.

16. A method of making split remateable connecting rod portions from a unitary ductile rod having an annular wall defining a crank opening with preformed surface crevices along a cracking plane, comprising:
  (a) charging hydrogen into a region of said wall along at least one part of said cracking plane including at least one crevice, with or without the concurrent application of static mechanical tensile loading at said included crevice insufficient to cause metal yielding; and
  (b) imposing, prolonging or increasing static mechanical tensile loading at said included crevice to effect fracture across the entire cracking plane and thereby separate the unitary connecting rod into a cap and body with rough fractured mating surfaces.

17. The method as in claim 16, in which said charging is carried out by creation of an electrolytic cell for dissolving hydrogen into said region.

18. The method as in claim 16, in which said charging is carried out by adding concentrated acid to the metal only at said region and concurrent imposition of static mechanical stress to induce an electrolytic cell without the imposition of an outside current source.

19. The method as in claim 18, in which charging is carried out for about 20–60 seconds and said step (b) is carried out for about 30–60 seconds.

20. The method as in claim 16, in which static mechanical loading is a static energy force that will effect a tensile stress in a metal at the root of the crevice of about 10–30% below the plastic yielding stress for said metal.

* * * * *